(12) United States Patent
Chatterjee et al.

(10) Patent No.: US 9,390,395 B2
(45) Date of Patent: Jul. 12, 2016

(54) METHODS AND APPARATUS FOR DEFINING A COLLABORATIVE WORKSPACE

(75) Inventors: Ramkrishna Chatterjee, Nashua, NH (US); Gopalan Arun, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1171 days.

(21) Appl. No.: 11/291,350

(22) Filed: Nov. 30, 2005

(65) Prior Publication Data

US 2007/0124373 A1 May 31, 2007

(51) Int. Cl.
*G06F 15/16* (2006.01)
*G06Q 10/10* (2012.01)
*H04L 12/18* (2006.01)

(52) U.S. Cl.
CPC ............ *G06Q 10/10* (2013.01); *H04L 12/1813* (2013.01)

(58) Field of Classification Search
CPC ............................. G06Q 10/10; H04L 12/1813
USPC .................................................. 709/204, 218
See application file for complete search history.

(56) References Cited

U.S. PATENT DOCUMENTS

| | | | |
|---|---|---|---|
| 5,980,096 A * | 11/1999 | Thalhammer-Reyero | |
| 6,473,766 B1 * | 10/2002 | Leiserson et al. | |
| 2002/0091702 A1 * | 7/2002 | Mullins | 707/100 |
| 2002/0173984 A1 * | 11/2002 | Robertson et al. | 705/1 |
| 2003/0009295 A1 * | 1/2003 | Markowitz et al. | 702/20 |
| 2003/0055939 A1 * | 3/2003 | Kayashima et al. | 709/223 |
| 2003/0217105 A1 * | 11/2003 | Zircher et al. | 709/205 |
| 2004/0088198 A1 * | 5/2004 | Childress et al. | 705/4 |
| 2004/0088647 A1 * | 5/2004 | Miller et al. | 715/500 |
| 2006/0053380 A1 * | 3/2006 | Spataro et al. | 715/753 |
| 2006/0161881 A1 * | 7/2006 | Saad et al. | 717/104 |
| 2006/0242626 A1 * | 10/2006 | Pham et al. | 717/121 |
| 2006/0245354 A1 * | 11/2006 | Gao et al. | 370/230 |
| 2007/0061428 A1 * | 3/2007 | Haley et al. | 709/220 |

* cited by examiner

*Primary Examiner* — Vivek Srivastava
*Assistant Examiner* — Normin Abedin (57) ABSTRACT

A workspace template is operative to store a collaboration workspace for successive reuse. A template script processor creates a parameterized metadata definition of a workspace. The metadata definition is written as an XML file to a storage repository. A template script processor parses the metadata XML representation to reinstantiate the workspace in the server. The workspace provides services via applications, and includes references to application objects in the applications. The server is operable to retrieve data in the application objects, modify data via the workspace, and store the modified data in the referenced application object. The workspace need not store data, since the server maps the references in the workspace to the respective services. The reused portions may encompass particular expertise gained or residing in the group, thus generally capturing and reusing the best practices of frequently used patterns, such as propagating a knowledge base of corporate practices and procedures.

9 Claims, 6 Drawing Sheets

METHODS AND APPARATUS FOR DEFINING A COLLABORATIVE WORKSPACE

BACKGROUND

In a modern information processing environment, a group of users often work together toward a common goal in a collaboration environment. A typical scenario occurs in an employment context between employees in a project group, for example. A project group often delegates tasks to individual members, and then reviews and aggregates the results that individual members produce into an integrated group product, document, application, or other output. Therefore, the project group often operates as a collaboration group, such that the collective efforts of the group may be aggregated into a whole as a finished product of the collaboration group.

The individual contributions by group members may be in a variety of forms, such as documents, code, figures, charts, memos, notes, and designs, for example. Often these contributions are electronically generated and modified by a variety of software applications, such as word processors, compilers, graphical tools, email, calendar tools, schedulers and the like, and are stored as a particular type of file, document or other data. Managing and coordinating the different contributions from the collaboration group typically involves ensuring that changes and additions made by each user are accessible to other users and not overwritten by other users. Accordingly, a conventional collaboration group work environment often employs a number of administrative tools and aids for providing operations such as configuration management, revision libraries, concurrency controls, and version tracking, to name several, for ensuring preservation of the collective group effort.

SUMMARY

Embodiments disclosed herein operate in a software based collaboration environment. In the system disclosed herein, a collaboration group of users coordinates and aggregates efforts through a common collaborative workspace via collaborative access to a set of independently operable software applications such as an email application, a file system application, a calendar application, a threaded discussion application, or other applications that are selectable for inclusion into the collaborative workspace. In general, the collaborative workspace allows users to access the set of independently operable software applications and coordinate contributions of individual users such that the common collaborative workspace effectively aggregates the collective effort of the collaboration group. The workspace is employable for a variety of group efforts, using any of the plurality of applications, for endeavors such as software development, document preparation and maintenance, design specifications, knowledge bases, and other collaborative undertakings in which a group of users focus their collective expertise on a solution or product. The system, methods and apparatus disclosed herein provide the ability to create a template for the collaborative workspace that allows a user such as a workspace administrator the ability to quickly define a new workspace for a specific collaborative project. By providing the ability to create workspace templates, the system disclosed herein speeds up the creation of new workspaces for new projects that might have common tasks involved with other former projects that used a similar workspace.

Further details and discussion on a collaboration workspace suitable for use with the template system disclosed herein are disclosed in co-pending U.S. patent application Ser. No. 11/291,352, filed Nov. 30, 2005, entitled "METHODS AND APPARATUS PROVIDING COLLABORATIVE ACCESS TO APPLICATIONS", the entire contents and teachings of which are hereby incorporated herein by reference in their entirety.

Conventional approaches to managing collective efforts of such a workgroup tend to employ proprietary forms and do not store information in a portable or widely recognized data format that may be exported, modified, and/or processed by external applications. Further, conventional collaboration approaches are lacking in the ability to retain a history or sequence of changes, additions and modifications to workspace entities. Further, conventional approaches do not provide support to enumerate intra group communication between members.

The system disclosed herein is based in part on the observation that in a collaborative environment, participants in the collaboration may repeatedly employ certain solution patterns from one collaborative project to another. Instead of users having to build such solution patterns from scratch every time using conventional collaboration technologies, a mechanism is needed to capture and reuse such frequently used collaborative solution patterns. Mechanisms disclosed herein allow collaborative workspace templates to be defined that can enumerate and "pre-define" particular solution patterns such as a particular related set of software applications, application data, workspace metadata, specific users and/or other collaboration information related to a project for reuse when a new workspace for a similar project is required. By being able to store such information in a workspace template, creation of a new workspace for the next project is greatly simplified since the template defines the workspace environment. Templates for different workspaces can be created, reused and modified for different types of collaborative projects.

Using techniques disclosed herein, best practice solution patterns designed by specific domain experts in particular areas of expertise (e.g. law, engineering, product development, project management, etc.) can be captured once in a template and reused again and again in projects in respective problem domains. This preservation helps in best practice enforcement and makes knowledge of domain experts easily available to multiple projects in respective problem domains. When building a team for a project, for example, users may also need advice on who should be considered for inclusion in the team. Instead of users having to search in an ad hoc manner, it is beneficial to have the system as disclosed herein be able to make recommendations based on statistics of contributions made by individuals in the past. Therefore, the workspace template technology disclosed herein is applicable to a variety of contexts and may be employed generally for capturing and reusing the best practices of frequently used patterns, such as propagating a knowledge base of corporate practices and procedures within templates that define aspects and fundamental tools and data for use and implementation of these practices and procedures.

As noted briefly above, conventional approaches for supporting collaboration groups have several limitations. Such conventional approaches typically use a proprietary format for defining frequently used patterns. In contrast, configurations disclosed herein employ an open representation in a markup form such as an extensible markup language (XML) based format. As a result, widely available tools for parsing and composing XML may be employed. Also, conventional approaches lack a mechanism to capture temporal information in a reusable parameterized form. These conventional approaches do not support storage of certain information (for example, configurations herein provide for an email address in the form ${workspace_name}_inbox@${domain}) in parameterized form in the template. Additionally, conventional approaches do not include any support for making recommendations on potential team members. Further, in conventional approaches the patterns are specially set up prior to capture and there is no support for selectively capturing patterns from ongoing projects in already operational workspaces in an on-demand manner.

Additionally, conventional approaches suffer from the shortcoming of being unable to effectively consolidate and integrate collaborative group efforts from a plurality of independently operable services (e.g. application that can be run standalone) by a plurality of users. Often, a variety of software applications are employed to gather, store, organize, and retrieve the working efforts of a collaboration group. A typical scenario is a group of employees tasked with generating a particular revision of a product or document. Using conventional systems, no framework is provided to provide collaborative access to independently operating applications. Configurations of the system disclosed herein are based, in part, on the observation that conventional software applications do not effectively integrate the efforts of, or support the notion of, a collaboration group. As an example, conventional storage mediums for storing the work product of the group may not adequately track the history and evolution of files, or may not isolate and coordinate modifications by different group members. Particular applications may not be compatible with a central repository or library employed for storing and maintaining documents, visuals, and code representative of the group work product. Individual contributions developed by standalone applications may not be identified and/or included in the collaborative group effort. Particular changes made by a subset of the group may be lost or overwritten by changes made by others. Configurations of the invention substantially overcome the above-described shortcomings by providing a workspace template operative to store and reinstantiate a collaboration workspace. The workspace template codifies selected portions of a workspace for successive reuse. The reused portions may represent aspects such as particular expertise gained or residing in the group, documents or formats expected to be employed and baseline or "building block" types of documents, code, or designs. The template can also define what independently operating (i.e. standalone) applications are to be included for access from the collaborative workspace from users logged into the workspace. For each application, the template can specify what application metadata for access to that application is to be included in a workspace that is defined based on the template.

For example, in a software development environment, a collaboration group may be responsible for delivering a subsystem (portion) of a software application. The individual members of the collaboration group develop software code files, which reside in a code library. The code library should track changes made to individual files, since an improper change may cause the entire subsystem to be inoperative. Further, the entire collaboration group may review the code, and changes or modifications may be proposed or made. There may also be lower level functions or operations, which change infrequently, and that are common to other subsystems as well. By way of example, there may be several different independently operable software applications used in this collaborative process, such as an email application, a file management application (such as a file system of an operating system), a calendaring application, a threaded discussion forum application or the like. Each application may independently operate in standalone mode via user access to that specific application in a conventional manner (e.g. a user using an email client to read or send his or her email messages), but additionally, each application is accessible from the collaborative workspace via users logged into this workspace as if the collaborative workspace were a single user operating the application itself. Users logged into the collaborative workspace can perform collaborative activities such as sending email, creating files, and operating other application functions from the collaborative workspace. The applications themselves maintain all application specific data and the collaborative workspace provides a framework for collaborative access to each of the applications as described in the formerly referenced co-pending patent application. The collaboration group workspace, therefore, captures the collective expertise of the group in an ongoing manner.

Configurations disclosed herein provide a mechanism to save selected portions of a workspace in a template and then later create a new workspace using the template such that another group (or the same group) may utilize portions or the entire workspace for a new collaborative project. In this manner, the workspace template enables capturing and reusing the best practices of frequently used patterns, effectively propagating a knowledge base of practices, methods, standards, and other corporate knowledge.

In further detail, the method of defining a workspace operable by a collaboration group as defined by configurations herein includes defining, via a graphical user interface, a workspace indicative of users and services in a collaboration environment, and extracting, from the defined workspace, a metadata definition corresponding to the workspace. The server instantiates, from the extracted metadata definition, a new workspace having properties corresponding to the previously defined workspace, in which the new instantiated workspace has similar services operable for further modification in the collaboration environment.

In the exemplary arrangement, instantiating the workspace includes parsing the metadata definition to identify the workspace properties, in which the properties include users and services available via the workspace, and building, from the metadata definition, a workspace in a server operable for collaboration by the users for invoking the services. The server establishes associations from the workspace to the invoked services, in which the associations reference data in the services for use in the workspace. In the exemplary arrangement, defining the workspace includes defining properties of the workspace, in which the properties include at least one of privileges, policies, users, and service data and metadata. The workspace provides the services via applications such that the associations further include references to application objects in the applications. The server is operable to retrieve data in the application objects, modify data by the users via the workspace, and store the modified data in the referenced application object. Storing the modified data includes storing attributes in a relational table having references to the data in the corresponding application. In this manner, the workspace need not store the actual data, as the server maps the references in the workspace to the respective services.

In particular configurations, extracting the template from a workspace includes capturing a solution pattern for reuse, in which capturing includes writing a hierarchical script, such that the hierarchical script has elements indicative of properties and attributes of the workspace. The exemplary hierarchical script is a markup definition having hierarchically nested tags corresponding to application objects. Such workspace properties include services provided by applications, and the attributes include references to data in the applications.

In the exemplary arrangement, instantiating the workspace involves instantiating the workspace on a server, in which the server has application managers in communication with respective applications via an adaptor defined by a resource framework. The server identifies, in an application manager, workspace activity corresponding to the application, communicates, via the adaptor, the identified activity to the application, and modifies the application according to the communicated activity.

In the exemplary configuration, the template is often generated from an existing first workspace, and employed for instantiating successive workspaces with similar properties. In other words, configurations herein disclose a method of propagating a knowledge base by defining a first workspace having properties, storing a template having attributes of the first workspace, in which the attributes are indicative of the properties, and instantiating a second workspace using the stored template, such that the instantiated workspace has users and services defined in the first workspace plus workspace properties specified at the time of template instantiation. The properties are indicative of at least one of privileges, policies, users and services.

Defining the first workspace further includes defining a workspace environment, in which the workspace environment has collaboration groups with members and services operable for executing executable operations, and creating a workspace such that the created workspace includes a set of users defining the collaboration group and at least one service provided by an application.

Accordingly, defining the first workspace further comprises identifying a collaborative solution pattern, the collaborative solution pattern defining a set of applications and a set of users, the applications corresponding to the services and operable to provide the services, and further responsive to the users via a resource framework, the resource framework having adaptors for coupling the applications to a server accessible to the users via a web gateway.

Alternate configurations of the invention include a multiprogramming or multiprocessing computerized device such as a workstation, handheld or laptop computer, cellphones or PDA device, or dedicated computing device or the like, configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations discussed further below provide a system and method for defining, capturing and reusing the collaborative workspace. As described above, the workspace is applicable to a variety of contexts and may be employed generally for capturing and reusing the best practices of frequently used patterns, such as propagating a knowledge base of corporate practices and procedures. Workspace definition and reuse is performed by providing a workspace template operative to store the collaboration workspace. The workspace template codifies selected portions of a workspace for successive reuse. The reused portions may represent aspects such as particular expertise gained or residing in the group, documents or formats expected to be employed and baseline or "building block" types of documents, code, or designs.

As indicated above, conventional collaboration mechanisms suffer from several shortcomings. Conventional approaches to managing collective efforts of such a workgroup tend to employ proprietary forms, and do not store information in a portable or widely recognized form that may be exported, modified, and/or processed by external applications. Further, conventional approaches are lacking in the ability to retain a history or sequence of changes, additions and modifications to workspace entities. Further, conventional approaches do not provide support to enumerate intra group communication between members.

In contrast, configurations discussed in further detail below employ a workspace template schema. Valid template documents conform to this schema. The exemplary template schema is built using several stand-alone XML schemas for templates of different collaborative entities (such as a document folder), however alternate markup languages or other representations may be employed. This approach reduces redundancy and increases reuse as the same XML schema types are used in templates for entire projects as well as in templates for specific collaborative entities. In the exemplary workspace template schema, an XML schema type hierarchy is used to model collaborative entity type hierarchy. For example, there is an abstract XML schema type for a collaborative resource template, and XML schema types for different collaborative resource templates (such as template for a document library) are derived from the abstract collaborative resource template type. This makes parsing and instantiation of templates easier The template employs a schema which allows large objects (such as file content) that are part of a template, to be specified out of line. The mappings between large object locations and their IDs are captured in a mapping table that is part of the template. The large objects are referred by their IDs in the rest of the template. During template instantiation the mapping table is consulted to locate the referred objects and copy them to the instantiated structure (e.g., project). This way the location and representation of a large object can be changed without affecting the rest of the template. This also allows different parsing schemes (SAX vs. DOM) to be used for large objects (SAX) and the rest of the template (DOM).

The result is a flexible system for detecting, capturing and reusing best practices and frequently used patterns, discussed further below, which enables users to take advantage of earlier work and knowledge of domain experts. This arrangement reduces the time and effort required to complete a project Accordingly, configurations disclosed herein provide a workspace template operative to store a collaboration workspace. The workspace template codifies selected portions of a workspace for successive reuse. A template script processor creates a metadata definition of a workspace. The metadata definition is written as an XML file to a storage repository. Since the workspace defers data storage to the respective applications providing the services, the metadata definition need not store data. The template script processor parses the metadata XML representation to instantiate the workspace in the server. The reused portions may represent aspects such as particular expertise gained or residing in the group, documents or formats expected to be employed, baseline or "building block" types of documents, code, or designs and frequently used best practice policies.

Figure 1:
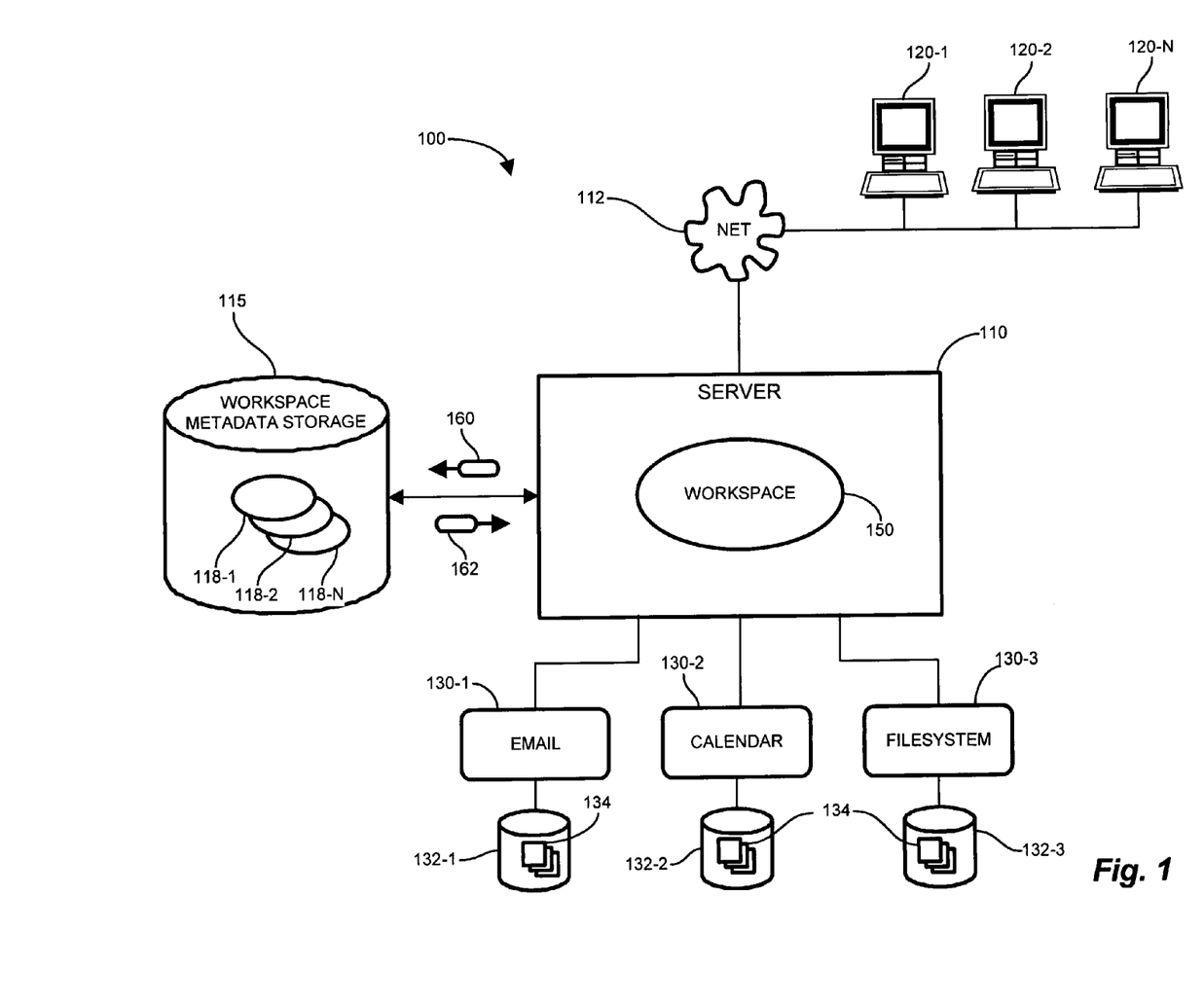
FIG. 1 is a context diagram of an exemplary collaboration environment suitable for use with configurations discussed herein

FIG. 1 is a context diagram of an exemplary collaboration environment 100 suitable for use with configurations discussed herein. Referring to FIG. 1, the collaboration environment 100 includes a collaboration server 110 and a plurality of users 120-1 . . . 120-N (120 generally) interconnected via a network 112 such as the Internet, VPN, LAN, WAN or other packet switched interconnection medium. The server 110 includes a workspace 150 for providing collaborative access to a plurality of applications 130-1 . . . 130-3 (130 generally). The applications 130, therefore, provide services to the users 120 via the workspace 150 and the network 112. Each of the applications 130 has respective storage areas 132-1 . . . 132-3 (132 generally) for storing application data 134, therefore relieving the workspace 150 from storing the application data 134 on behalf of the users 120.

The workspace 150, therefore, includes metadata defining the application data 134 stored by the applications 130 on behalf of each user 120. The workspace 150 includes properties 160 that define how the users 120 interact with the applications 130. The server 110 also connects to workspace metadata storage 115, which is operable to store the properties 160 of the workspace 150 as a template 118-1 . . . 118-N (118 generally) on a disk volume or other form of workspace metadata storage 115, such as a local storage volume. Such a local storage volume is operable to store both templates and properties of presently instantiated (i.e. live or persistent) workspaces 150. The properties 160 define aspects such as privileges, policies, other users 120 and available applications 130 (services) corresponding to a particular workspace 150. The server 110 is operable to instantiate the templates 118 for generating (e.g. instantiating) a workspace 150 having similar properties. The workspace metadata storage 115 volume may store a plurality of templates 118-1 . . . 118-N corresponding to different workspaces 150. Note that a template is not limited to a single instantiated workspace. Many workspaces may be instantiated from a template. Some templates may not have any workspace yet instantiated from them and certain templates may be directly composed using a tool such as the XML editor discussed below. The server 110 is operable to recall the saved templates 162 for instantiation into a workspace 150 having the corresponding properties 160.

Figure 2:
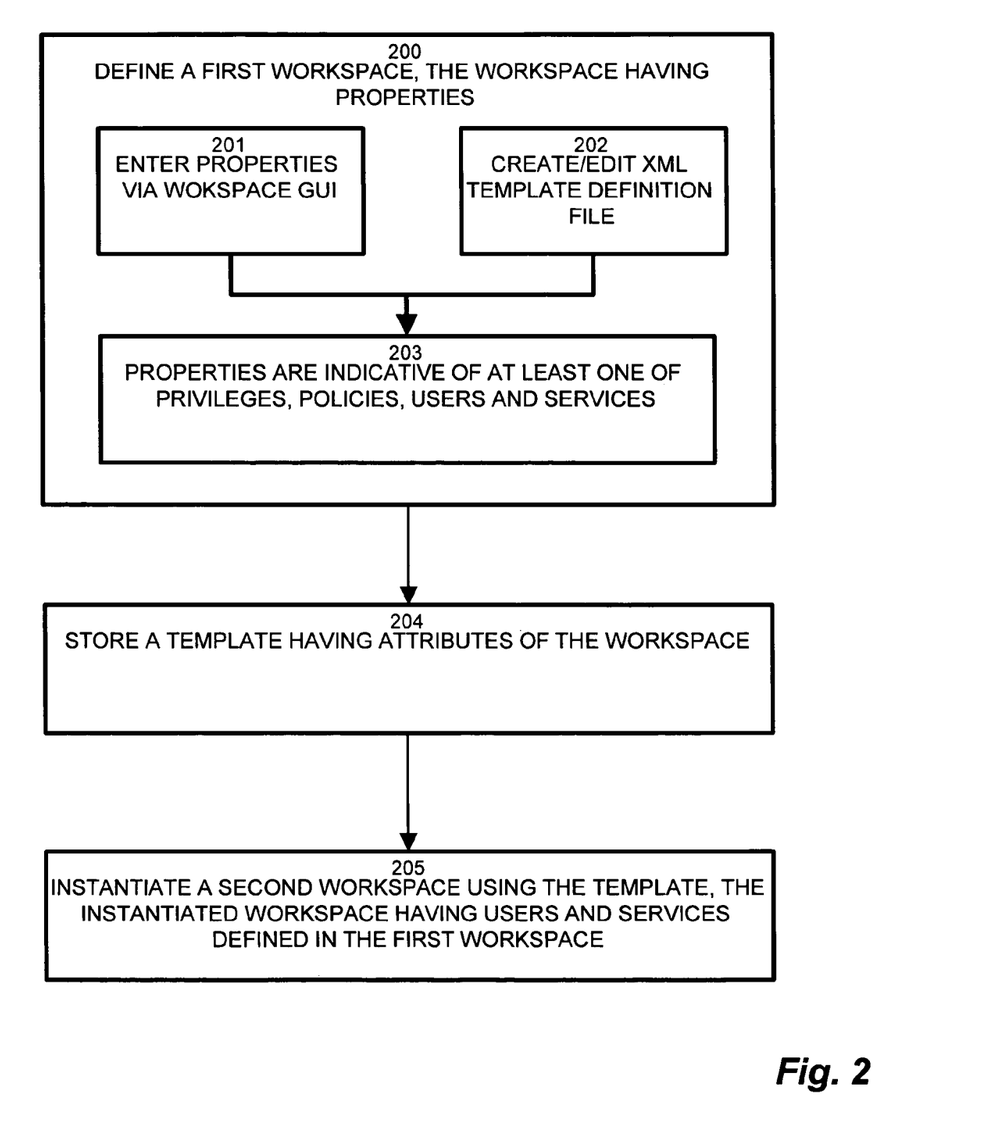
FIG. 2 is a flowchart of workspace reuse via template instantiation in the environment in FIG. 1.

FIG. 2 is a flowchart of workspace 150 reuse via template instantiation in the environment in FIG. 1. The workspace 150 is applicable to a variety of contexts and may be employed generally for capturing and reusing the best practices of frequently used patterns, such as propagating a knowledge base of corporate practices and procedures. Referring to FIGS. 1 and 2, at step 200, the method for capturing and reusing a workspace in a collaboration environment includes defining a first workspace having properties. A user defines a template by either creating a workspace via a graphical user interface (GUI), as depicted at step 201, and then creating a template from it or by editing a definition file (e.g. XML file) that defines the workspace properties and other variables, as shown at step 202. In this arrangement, the template is directly composed using an XML editor, instead from a previously instantiated (GUI defined) workspace. Directly composing the template via the XML syntax generally provides additional flexibility. For example, the user may include parameterized information like email address of the form ${workspace_name}@${domain}. Here, ${xxx} are template parameters which are instantiated using values provided by the user at the time of template instantiation. In this case, the actual email address is composed using the workspace name and domain address provided by the user at the time of template instantiation. Another example is parameterized meeting start time.

The workspace properties, discussed further in the copending application cited above, are indicative of at least one of privileges, policies, users and services in the workspace, as depicted at step 203. Accordingly, defining the first workspace further includes defining a workspace environment 100 having collaboration groups with members and services operable for executing executable operations, and then instantiating, or creating, the workspace 150 such that the created workspace includes a set of users defining the collaboration group and at least one service. In the workspace, the services correspond to the applications 130 available to the workspace members (users) for performing operations.

At step 204, the server 110 stores a template 118 having attributes of the workspace 150, in which the attributes define the properties such that they may be retrieved later. In the exemplary configuration, the first workspace refers to a model or baseline version of a workspace, typically based on an ideal set of properties for the task at hand. For example, a template may be employed for a project, product release, code version, document development, or other type of undertaking that is likely to be repeated. At step 205, the server 110 instantiates a second workspace using the stored template 118, the instantiated workspace having users and services defined in the first workspace. The instantiated workspace therefore includes the properties stored from the first workspace, and serves as a starting point for the second (or successive) workspaces such that users may enhance or refine the workspace 150 using the instantiated properties. The second workspace typically refers to a series of successive workspaces 150-N instantiated from the model template 118 encapsulated in the first template. Further, an initial workspace may not necessarily be a specially created model workspace. Configurations herein allow the user to selectively include portions of an on-going project workspace in a template for reuse. In contrast to conventional collaboration approaches, a partial or skeletal template may be created for later refinement or "fleshing out" of more finely tuned detail to suit a particular need or set of common tasks.

Figure 3:
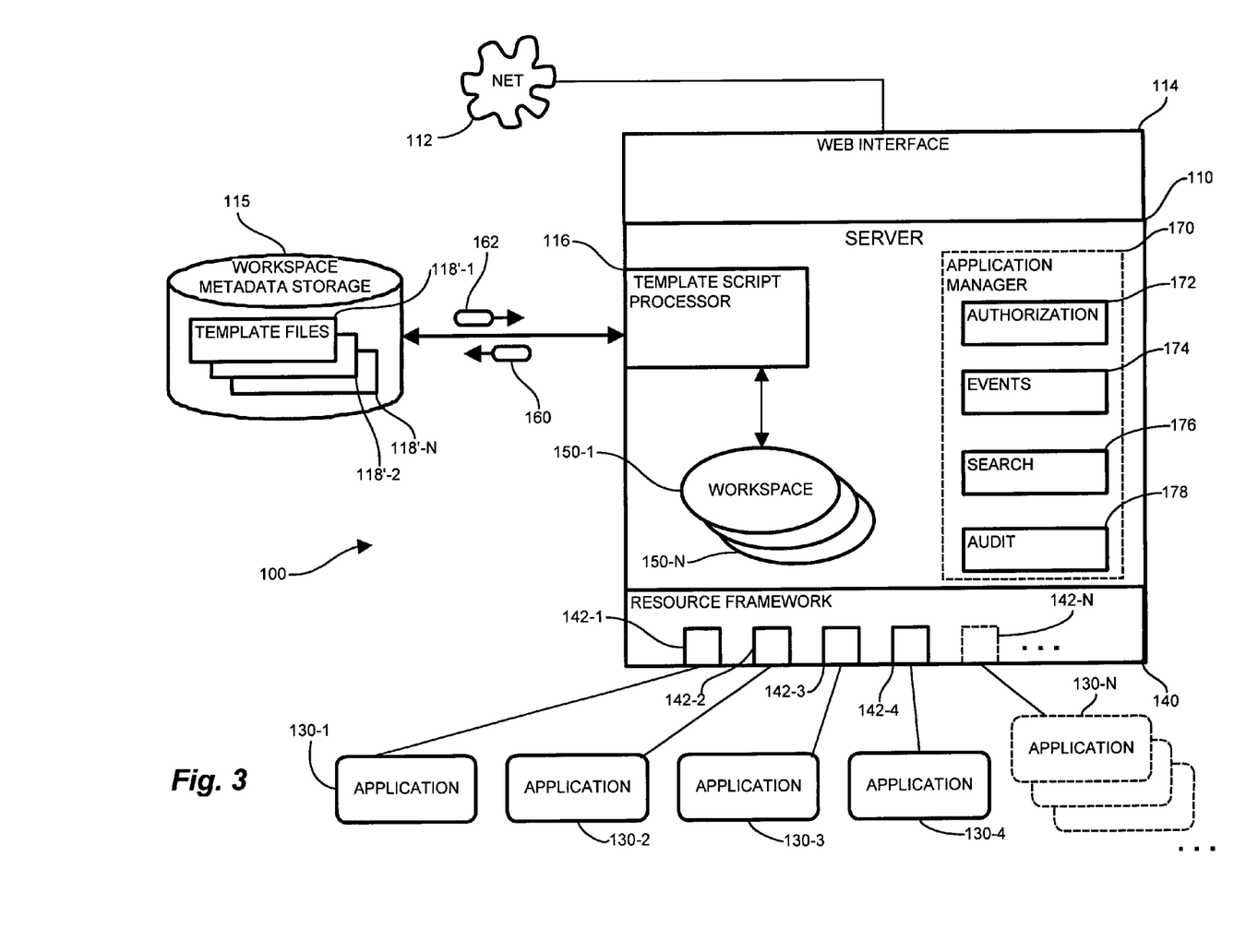
FIG. 3 is a block diagram of a collaboration server operable for template usage according to the sequence in FIG. 2.

FIG. 3 is a block diagram of a collaboration server 10 operable for template usage according to the sequence in FIG. 2. Referring to FIGS. 1 and 3, the server 110 includes a web interface 114 and a resource framework 140 having adaptors 142-1 . . . 142-N (142 generally) for each application 130 supported by the server 110. The server 110 may include a plurality of workspaces 150-1 . . . 150-N, each of which may access the applications 130 via the adaptors 142. An application manager 170 performs administrative functions for allowing the workspaces to employ the applications 130, and includes an authorization process 172, an events process 174, a search process 176 and an audit process 178. The authorization manager 172 performs access control from the workspaces 150 to the applications 130. An events process 174 processes events such as user notifications for changes in applications 130. A search process 176 performs searching operations for retrieving XML templates 118'-1 . . . 118'-N (118', generally) and application data for successive modifications, editing and/or instantiation. An audit process 178 maintains a log of application accesses for compliance with auditing and regulatory requirements, such as government mandated reporting. Other processes may be included for coordinating workspace 150 invocation of the applications 130.

In operation, a user creates a workspace 150 on the server via a GUI or other means, as described in the copending application cited above (OID05-01). A template script processor 116 stores the workspace as an XML template 118' or other nonvolatile form. The script processor 116 traverses the workspace, which includes examining the tables defining the workspace, discussed further below, and generates an XML version 160 of the metadata defining the workspace. The XML definition 160, discussed further below with respect to FIG. 8, includes the workspace properties, users, applications, files, documents, and other workspace entities, also discussed further below. A local workspace storage repository 115 stores the templates as XML files 118'-1 . . . 118'-N (118' generally) for later retrieval. The template script processor 116 retrieves the XML template 118', typically in response to a user 120 request, parses the XML 162 and instantiates the workspace 150 in the server 110, thus retaining the properties and other workspace entities for successive use.

Figure 4:
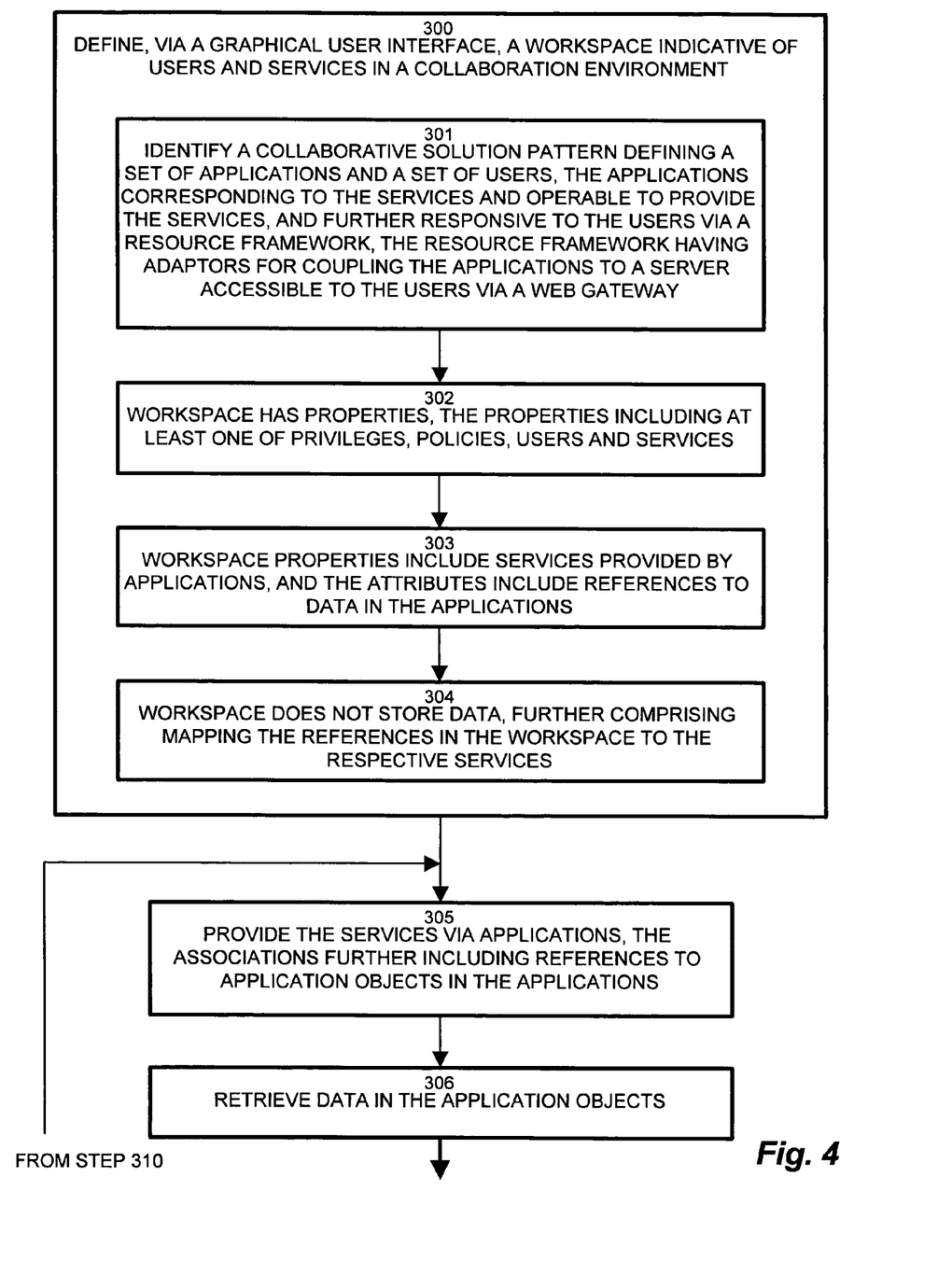
FIGS. 4-6 are an exemplary sequence of template usage in the system depicted in FIG. 3.
Figure 5:
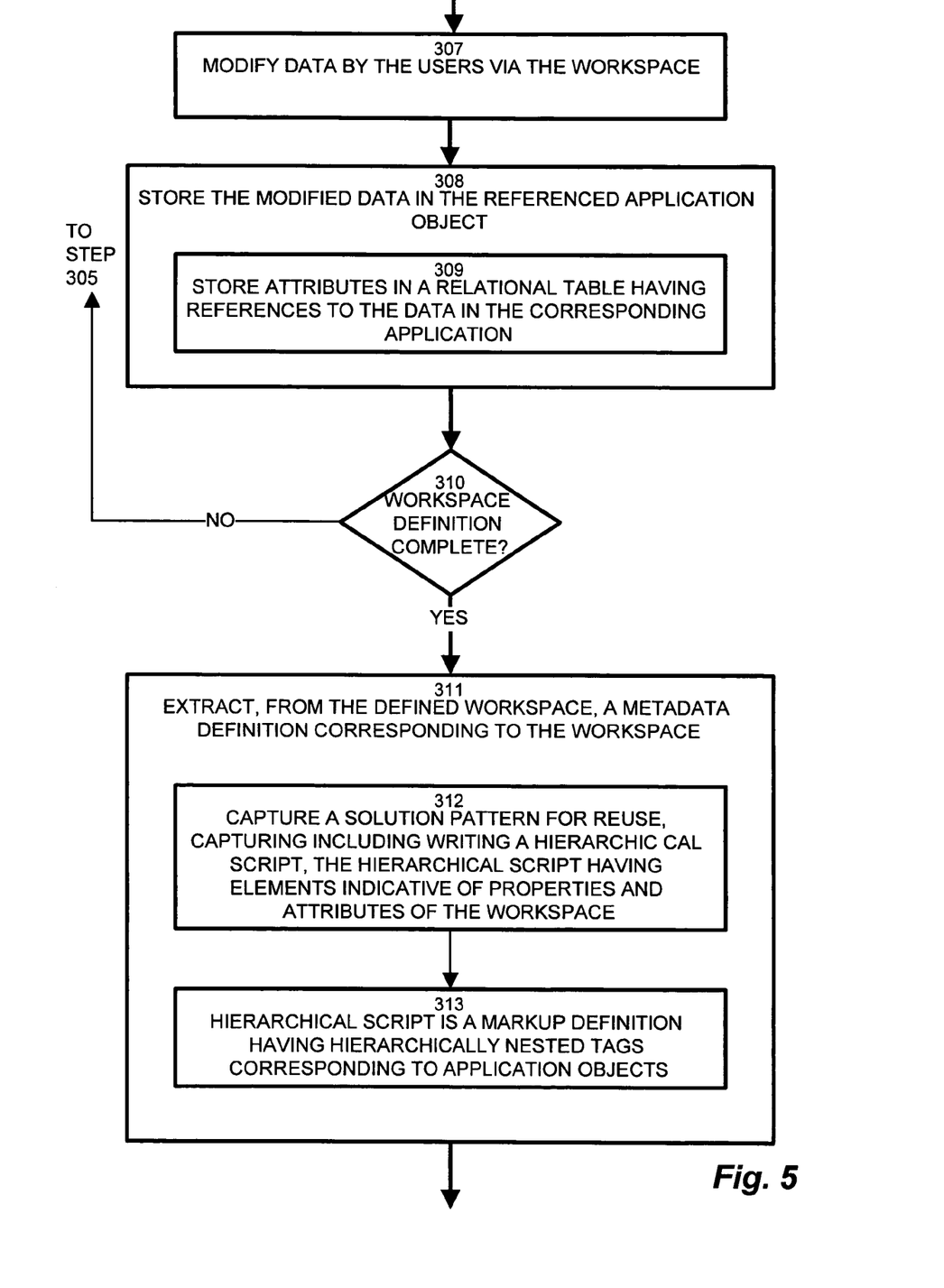
Figure 6:
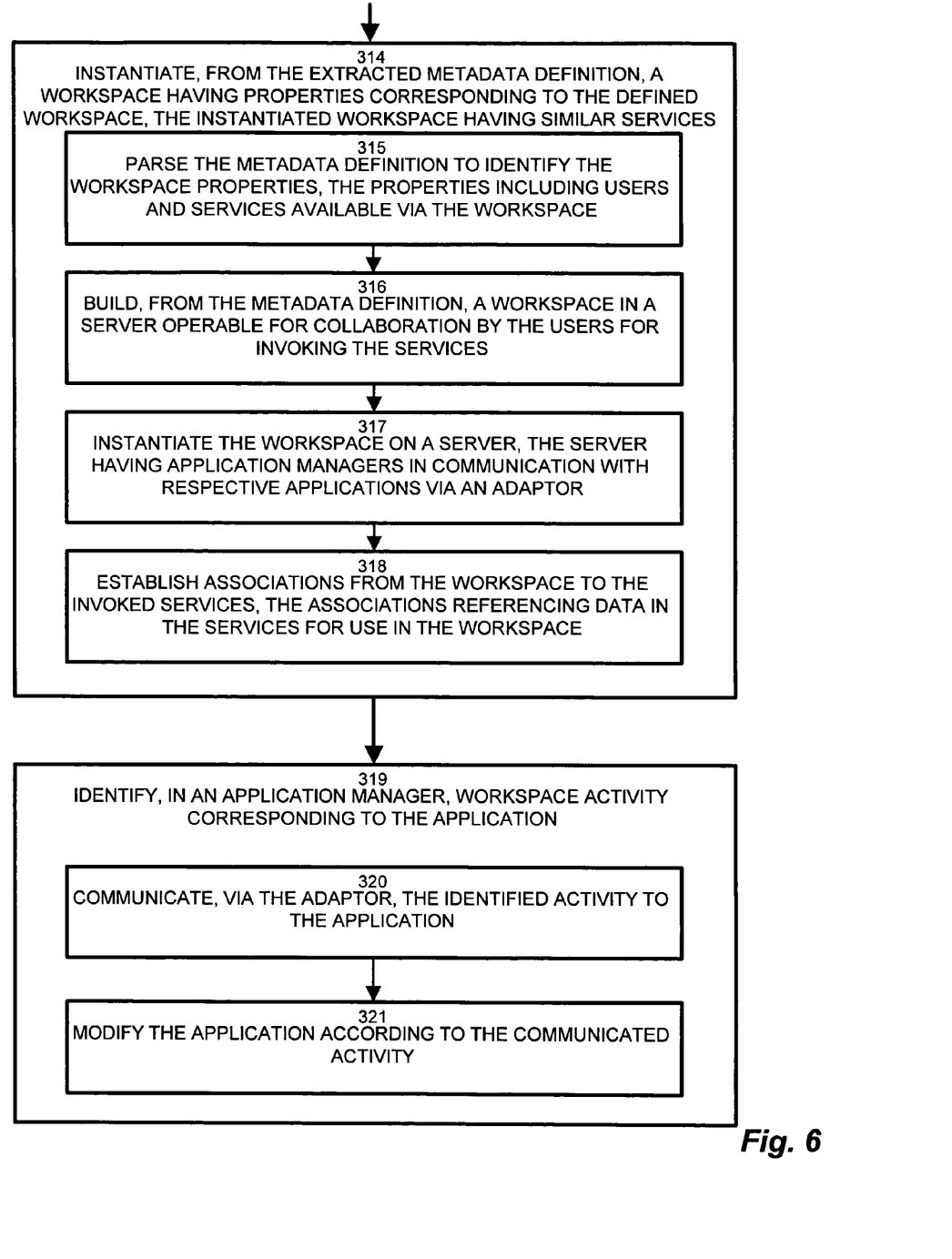

FIGS. 4-6 are an exemplary sequence of template usage in the system depicted in FIG. 3. Referring to FIGS. 1 and 3-6, the method of defining, collecting, and reusing a workspace operable by a collaboration group as defined herein includes, at step 300, defining, via a graphical user interface, a workspace 150 indicative of users and services in a collaboration environment 100. Users typically define and develop the workspace using a GIU application via the network 112 to enumerate the properties of the workspace 150. Accordingly, at step 301, defining the first workspace further includes identifying a collaborative solution pattern to define a set of applications and a set of users, such that the applications correspond to the services and operable to provide the services, and are further responsive to the users via a resource framework, in which the resource framework has adaptors 142 for coupling the applications 130 to the server 110 accessible to the users via a web gateway. As noted above, a stored workspace may not be a workspace specially created for template creation. It may, for example, be a workspace for any ongoing project, such that the user may decide to capture portions of this workspace in a template for reuse. In fact, the user may create the template using a two step process. In the first step, the user generates the template from an on-going project and then in the second step modifies the XML document generated in the first step using a template development tool (e.g., XML editor) to include parameterized information.

The workspace 150 has a set of properties, in which the properties include at least one of privileges, policies, users and services in the workspace 150, as depicted at step 302. In alternate configurations, other properties and artifacts may likewise be defined in a particular workspace 150. The workspace 150 properties include services provided by applications 130, and the attributes include references to data in the applications, as depicted at step 303. Accordingly, the workspace 150 does not store data, and is further operable to map the references in the workspace 150 to the respective services, as depicted at step 304, effectively pushing the actual data storage down into the respective applications 130. The workspace 150 itself stores only references, or pointers, to the data resident in the applications 130. A set of tables in the workspace, discussed further below, stores these references (e.g. pointers). Therefore, at step 305, a particular workspace 150 provides the services via applications associated with (included in) the workspace, such that the associations further include references to application objects, or data 134, in the applications 130. In developing the workspace 150 for the template, the server 110 retrieves data 134 in the application objects, as depicted at step 306, and may modify the data 134 via the workspace in the course of performing the application 130, as depicted at step 307. The workspace 150 stories the modified data in the referenced application 130 object, as shown at step 308. At step 309, storing the modified data further includes storing attributes in a relational table having references to the data in the corresponding application 130. Therefore, the exemplary workspace 150 includes a set of relational tables for storing attributes indicative of the workspace properties for retrieving stored data from the applications 130 at a successive time via the references.

The user 120 continues defining the workspace 150 as above until the workspace definition is complete and represents the desired template 118' contents. A check is performed, at step 310, to iteratively invoke applications 130 and related functions for defining and extending the workspace 150, and control reverts to step 305 until completion, at which point the workspace 150 represents the desired template 118 to be stored. Accordingly, at step 311, the workspace metadata storage repository 115 receives, from the defined workspace 150, a metadata definition 118 corresponding to the workspace 150, as depicted at step 311. Therefore, extracting includes capturing a solution pattern for reuse, capturing including writing a hierarchical script, such that the hierarchical script has elements indicative of properties and attributes of the workspace, as shown at step 312. In the exemplary configuration, the hierarchical script is an XML markup definition having hierarchically nested tags corresponding to application objects, and is stored as a template file 118'-1 . . . 118'-N (118 generally), as depicted at step 313.

Following step 313, the template 118 is stored as a template file 118' in the workspace metadata storage 115 repository. In the exemplary configuration, as indicated above, the template 118 is a metadata representation of the workspace 150 in an XML format operable for parsing by the template script processor 116. At a subsequent time, responsive to a user request, the server 110 instantiates, from the extracted metadata definition (i.e. the XML file 118), the workspace having properties corresponding to the defined workspace (stored as the template file 118'), the instantiated workspace having similar services operable for further modification in the collaboration environment, as depicted at step 314. The parameterized information in the template is instantiated using parameter values provided by the user at the time of template instantiation. The user also provides values for certain workspace attributes not stored in the template (e.g., workspace name). Accordingly, in further detail, the template script processor 116 parses the metadata definition (i.e. template file 118') to identify the workspace properties, in which the properties include users, policies and services available via the workspace 150, as disclosed at step 315. The template script processor 116 builds, from the metadata definition 116, the workspace 150 in the server 110 operable for collaboration by the users 120 for invoking the services, as depicted at step 316. The server 110 instantiates the workspace 150, such that the server 110 has application managers 170 in communication with respective applications 130 via one or more adaptors 142, as shown at step 317. At step 318, the server 110 establishes associations from the workspace 150 to the invoked services via the applications 130 providing the services, in which the associations reference data 134 in the services for use in the workspace 150, as depicted at step 318. Thus, the individual applications 130 maintain the data for each of the constituent workspaces 150 in the server, via references (i.e. typically pointers) from the workspace 150. This enables the template 118' corresponding to the workspace 150 to be saved and retrieved as metadata, since the actual data does not reside in the workspace 150.

As the users 120 of the workspace invoke services, the server 110 identifies, in the application manager 170, workspace 150 activity corresponding to an application 130, as shown at step 319, meaning that a user is attempting to perform an operation in the workspace that requires execution of an application 130. Responsively, at step 320, the workspace 150 communicates, via the corresponding adaptor 142, the identified activity to the application 130 providing the requested service, as depicted at step 320. Accordingly, the invocation results in the application performing the service and modifying the application 130 and/or application data 134 according to the communicated activity, as disclosed at step 321.

TABLE I

```
<workspaceTemplate
    xmlns:xsi="XMLSchema-instance"
    xmlns="/wstemplate"
    xsi:schemaLocation="wstemplate cw/wstemplate.xsd">
<templateProperties>
<name>Test template - tasks</name>
<description>Workspace template for testing task
specification</description>
<createdBy>orcladmin</createdBy>
<createdOn>2004-07-29T15:50:00</createdOn>
</templateProperties>
<workspaceDetails>
    <properties>
        <MEMBER_DEFAULT_ROLE>READER</MEMBER_DEFAULT_ROLE>
    </properties>
    <resources>
        <resource xsi:type="CalendarType">
            <name>Meeting tracker</name>
            <description>tracks project meetings</description>
            <vtodos>
                <vtodo>
                    <summary>test task1</summary>
                    <description>a test task</description>
                    <priority>1</priority>
                    <cw-dtstart>3600000</cw-dtstart>
                    <duration>3600000</duration>
                </vtodo>
                <vtodo>
                    <summary>test task2</summary>
                    <description>another test task</description>
                    <priority>2</priority>
                    <cw-dtstart>0</cw-dtstart>
                    <duration>86400000</duration>
                </vtodo>
            </vtodos>
        </resource>
    </resources>
</workspaceDetails>
</workspaceTemplate>
<workspaceTemplate
    xmlns:xsi="www.w3.org/2001/XMLSchema-instance"
    xmlns="xmlns.oracle.com//wstemplate"
    xsi:schemaLocation="xmlns.oracle.com//wstemplate
xmlns.oracle.com//wstemplate.xsd">
<templateProperties>
<name>Test Template - File Content</name>
<description>For testing files specification in a workspace
template</description>
<category>System.general</category>
<createdBy>orcladmin</createdBy>
<createdOn>2004-07-29T15:50:00</createdOn>
```

TABLE I-continued

```xml
    </templateProperties>
    <contentLocations>
        <contentLocation>
            <contentID>1</contentID>
            <location>/us/workspaces/CWTEMPLATEFILES/templates.ppt</location>
        </contentLocation>
        <contentLocation>
            <contentID>2</contentID>
            <location>/us/workspaces/CWTEMPLATEFILES/templates.ppt</location>
        </contentLocation>
    </contentLocations>
    <workspaceDetails>
        <properties>
            <MEMBERSHIP_NOTIFICATION>ALL_MEMBERS</MEMBERSHIP_NOTIFICATION>
            <MEMBER_DEFAULT_ROLE>READER</MEMBER_DEFAULT_ROLE>
        </properties>
        <resources>
            <resource xsi:type="FilesType">
                <name>Library</name>
                <description>Workspace document library</description>
                <libraryDetails>
                    <files>
                        <file>
                            <name>testFile1.ppt</name>
                            <description>test file1</description>
                            <content><contentID>1</contentID></content>
                        </file>
                        <file>
                            <name>testFile2.doc</name>
                            <description>test file2</description>
                        </file>
                    </files>
                    <folders>
                        <folder>
                            <name>Design</name>
                            <description>design documents</description>
                            <folder Details>
                                <files>
                                    <file>
                                        <name>testFile1.ppt</name>
                                        <description>test file1</description>
                                        <content><contentID>2</contentID></content>
                                    </file>
                                </files>
                            </folderDetails>
                        </folder>
                        <folder>
                            <name>References</name>
                            <description>List reference documents</description>
                        </folder>
                    </folders>
                </libraryDetails>
            </resource>
        </resources>
    </workspaceDetails>
</workspaceTemplate>
<workspaceTemplate xmlns:xsi="www.w3.org/2001/XMLSchema-
        instance" xmlns="xmlns.oracle.com/workspaces/wstemplate"
        xsi:schemaLocation="xmlns.oracle.com/workspaces/wstemplate
        xmlns.oracle.com/workspaces/wstemplate.xsd">
    <templateProperties>
        <name>Template with parametrized email address</name>
        <description>Template for testing specification of workspace
            email configuration options</description>
        <category>test.general</category>
        <createdBy>System</createdBy>
        <createdOn>2004-08-12T15:50:00</createdOn>
    </templateProperties>
    <workspaceDetails>
        <properties>
            <MEMBERSHIP_NOTIFICATION>ALL_MEMBERS</MEMBERSHIP_NOTIFICATION>
            <MEMBER_DEFAULT_ROLE>WRITER</MEMBER_DEFAULT_ROLE>
            <MEMBER_ACCESS>ENABLED</MEMBER_ACCESS>
            <PUBLICLY_LISTED>false</PUBLICLY_LISTED>
        </properties>
        <resources>
            <resource xsi:type="EmailType">
                <name>Inbox</name>
```

TABLE I-continued

```
            <description>Workspace inbox</description>
            <incomingEmailPolicy>OPEN</incomingEmailPolicy>
        <forwardingEmailAddress>Ramkrishna.Chatterjee@ora
            cle.com</forwardingEmailAddress>
        <subscriptionPolicy>SEND_MESSAGES_TO_ALL_MEMB
            ERS</subscriptionPolicy>
            <subscriptionMessageFormat>a test message
                format</subscriptionMessageFormat>
        <emailAddressPrefix>${workspace-name}_inbox
        </emailAddressPrefix>
        </resource>
    </resources>
    </workspaceDetails>
</workspaceTemplate>
```

Table I is an exemplary syntactical representation of a template 118' using an exemplary markup language. In the exemplary configuration, the XML template 118' representation includes syntax applicable to creating, storing and instantiating the templates. In the exemplary arrangement in Table I, the user supplies workspace name at template instantiation time, and, based on the workspace name, the email address of the workspace is generated. The template 118' stores the email address in a parameterized form. Further, a workspace may be created using more than one template 118. For example, the template script processor 116 may parse multiple XML template files to instantiate a workspace having properties of all the parsed templates.

The exemplary server 110 employs an open XML based format for templates. As is known in the art, XML documents typically employ a predefined schema, discussed further below. In the exemplary configuration, an XML schema for templates (CW template schema) is employed, to which valid template documents conform. Table II shows a portion of the exemplary schema corresponding to the template fragment of Table 1. The CW template schema is built using several stand-alone XML schemas for templates of different collaborative entities (such as a document folder). This reduces redundancy and increases reuse as the same XML schema types are used in templates for entire projects as well as in templates for specific collaborative entities. In the CW template schema, an XML schema type hierarchy is used to model a collaborative entity type hierarchy. For example, there is an abstract XML schema type for a collaborative resource template, and XML schema types for different collaborative resource templates (such as a template for a document library) derive from the abstract collaborative resource template type. This XML format, which is operable for parsing and processing by XML conversant applications, facilitates parsing and instantiation of templates 118'.

TABLE II

```
<xs:schema targetNamespace="xmlns.oracle.com/cw/wstemplate"
    xmlns:xs="www.w3.org/2001/XMLSchema"
    xmlns:wst="xmlns.oracle.com/cw/wstemplate"
    elementFormDefault="qualified"
    attributeFormDefault="unqualified">
<xs:annotation>
    <xs:documentation xml:lang="en">
        XML schema definition for workspace templates.
        </xs:documentation>
</xs:annotation>
<xs:complexType name="ResourceType" abstract="true">
    <xs:sequence>
            <xs:element name="name"                          type="xs:string"/>
            <xs:element name="description"                   type="xs:string"/>
        </xs:sequence>
</xs:complexType>
<xs:complexType name="EntityType" abstract="true">
        <xs:attribute name="id" type="xs:ID" use="optional"/>
</xs:complexType>
<xs:complexType name="PrivilegeGrantsType">
        <xs:sequence>
                <xs:element name="privilegeGrant" maxOccurs="unbounded">
                        <xs:complexType>
                            <xs:sequence>
                                    <xs:element name="privilegeName"   type="wst:PrivilegeName"/>
                                    <xs:element name="grantee"         type="wst:IdentityType"/>
                                    <xs:element name="granteeType"     type="wst:GranteeType"/>
                                </xs:sequence>
                        </xs:complexType>
                </xs:element>
        </xs:sequence>
</xs:complexType>
<xs:simpleType name="PrivilegeName">
        <xs:restriction base="xs:string">
                <xs:enumeration value="READ"/>
                <xs:enumeration value="WRITE"/>
                <xs:enumeration value="ADMIN"/>
        </xs:restriction>
```

TABLE II-continued

```
</xs:simpleType>
<xs:element name="workspaceTemplate"
type="wst:WorkspaceTemplateType"/>
<xs:complexType name="WorkspaceTemplateType">
    <xs:sequence>
        <xs:element name="templateProperties"
type="wst:TemplatePropertiesType"/>
        <xs:element name="contentLocations" minOccurs="0">
            <xs:complexType>
                <xs:sequence>
                    <xs:element name="contentLocation" maxOccurs="unbounded">
                        <xs:complexType>
                            <xs:sequence>
                                <xs:element name="contentID"           type="xs:string"/>
                                <xs:element name="location"            type="xs:string"/>
                            </xs:sequence>
                        </xs:complexType>
                    </xs:element>
                </xs:sequence>
            </xs:complexType>
        </xs:element>
        <xs:element name="workspaceDetails"
type="wst:WorkspaceSpecificationType"/>
    </xs:sequence>
</xs:complexType>
<!-- Type for template properties such as owner, description etc. -->
<xs:complexType name="TemplatePropertiesType">
    <xs:sequence>
        <xs:element name="name"                       type="xs:string"/>
        <xs:element name="description"                type="xs:string"/>
        <!-- domain identifies the field to which the template applies,
                e.g., Life Sciences, Manufacturing, Education etc. -->
        <xs:element name="category"                   type="xs:string" minOccurs="0"  />
        <xs:element name="about URL"                  type="xs:anyURI" minOccurs="0"  />
        <xs:element name="createdBy"                  type="xs:string"/>
        <xs:element name="createdOn"                  type="xs:dateTime"/>
    </xs:sequence>
</xs:complexType>
<xs:complexType name="WorkspaceSpecificationType">
    <xs:sequence>
        <xs:element name="properties"
type="wst:WorkspacePropertiesType"                             minOccurs="0"  />
        <xs:element name= "members"                   type="wst:WorkspaceMembersType"
                    minOccurs="0"  />
        <xs:element name="subGroups"                  type="wst:SubGroupsType"
                    minOccurs="0"  />
        <xs:element name="resources"                  type="wst:ResourcesType"
                    minOccurs="0"  />
        <xs:element name="subWorkspaces"              type="wst:SubWorkspacesType"
                    minOccurs="0"  />
    </xs:sequence>
</xs:complexType>
<!-- Type for workspace configuration options such as member access,
default workspace role etc. -->
<xs:complexType name="WorkspacePropertiesType">
    <xs:all>
        <xs:element name="MEMBERSHIP_NOTIFICATION"
type="wst:MembershipNotificationValues"                        minOccurs="0"  />
        <xs:element name="MEMBER_ACCESS"
type="wst:MemberAccessSettingValues"                           minOccurs="0"  />
        <xs:element name="MEMBER_DEFAULT_ROLE"
type="wst:WorkspaceMemberRoles"                                minOccurs="0"  />
        <xs:element name="PUBLICLY_LISTED"                     type="xs:boolean"
                                minOccurs="0"  />
    </xs:all>
</xs:complexType>
<!-- The FilesType is an extension of the ResourceType -->
<xs:complexType name="FilesType">
    <xs:complexContent>
        <xs:extension base="wst:ResourceType">
            <xs:sequence>
                <xs:element name="versioningConfiguration"
type="wst:FilesVersioningConfigType" minOccurs="0"/>
                <xs:element name="libraryDetails" type="wst:FolderSpecType"
minOccurs="0"/>
            </xs:sequence>
        </xs:extension>
    </xs:complexContent>
</xs:complexType>
        <xs:complexType name="FileSpecType">
```

TABLE II-continued

```
            <xs:complexContent>
                <xs:extension base="wst:EntityType">
                    <xs:sequence>
                        <xs:element name="name"
                            type="wst:NonEmptyString"  />
                        <xs:element name="description"
                            type="wst:NonEmptyString" minOccurs="0"
                            />
                        <xs:element name="content"
                            type="wst:FileContentType" minOccurs="0"  />
                    </xs:sequence>
                </xs:extension>
            </xs:complexContent>
        </xs:complexType>
        <xs:complexType name="FileContentType">
            <xs:choice>
                <!--
                UUEncoded content string
                -->
                <xs:element name="inlinedContent"
                    type="wst:NonEmptyString"  />
                <!--
                    reference to content stream stored separately
                -->
                <xs:element name="contentID"
                    type="wst:NonEmptyString"/>
            </xs:choice>
        </xs:complexType>
<!-- The EmailType is an extension of the ResourceType -->
<xs:complexType name="EmailType">
    <xs:complexContent>
        <xs:extension base="wst:ResourceType">
            <xs:sequence>
                <xs:element name="incomingEmailPolicy"
type="wst:IncomingEmailPolicyType" minOccurs="0"/>
                <xs:element name="forwardingEmailAddress" type="xs:string"
minOccurs="0"/>
                <xs:element name="subscriptionPolicy"
type="wst:EmailSubscriptionPolicyType" minOccurs="0"/>
                <xs:element name="subscriptionMessageFormat" type="xs:string"
minOccurs="0"/>
                <!-- parametrized email address, e.g., $(workspace-name)_inbox,
without email domain -->
                <xs:element name="emailAddressPrefix" type="xs:string"
minOccurs="0"/>
            </xs:sequence>
        </xs:extension>
    </xs:complexContent>
</xs:complexType>
<!-- The CalendarType is an extension of the ResourceType -->
<xs:complexType name="CalendarType">
    <xs:complexContent>
        <xs:extension base="wst:ResourceType">
            <xs:sequence>
                <xs:element name="vevents"            minOccurs="0">
                    <xs:complexType>
                        <xs:sequence>
                            <xs:element name="vevent" maxOccurs="unbounded">
                                <xs:complexType>
                                    <xs:complexContent>
                                        <xs:extension base="wst:EntityType">
                                            <xs:sequence>
                                                <xs:group ref="wst:VeventGroup"/>
                                                <xs:element name="web-conference-details"
type="wst:WcDetailsType" minOccurs="0"/>
                                                <!-- attendee must be a member specified in the
template -->
                                                <xs:element name="attendees"
type="wst:IdentitiesType" minOccurs="0"  />
                                            </xs:sequence>
                                        </xs:extension>
                                    </xs:complexContent>
                                </xs:complexType>
                            </xs:element>
                        </xs:sequence>
                    </xs:complexType>
                </xs:element>
                <xs:element name="vtodos"            minOccurs="0">
                    <xs:complexType>
                        <xs:sequence>
```

TABLE II-continued

```
                <xs:element name="vtodo" type="wst:VtodoType"
maxOccurs="unbounded"/>
            </xs:sequence>
          </xs:complexType>
        </xs:element>
      </xs:sequence>
    </xs:extension>
  </xs:complexContent>
</xs:complexType>
```

The workspace template schema allows large objects (such as file content) that are part of a template 118' to be specified out of line. The mappings between large object locations and their IDs are captured in a mapping table that is part of the template. The large objects are referred by their IDs in the remainder of the template. During template 118 instantiation, as the workspace 150 is instantiated, the mapping table is consulted to locate the referred objects and copy them to the instantiated structure (e.g., project). In this manner the location and representation of a large object can be changed without affecting the rest of the template. This also allows different parsing schemes (SAX vs. DOM) to be used for large objects (SAX) and the rest of the template (DOM).

All temporal data in a template is stored as durations relative to the template 118 instantiation time. This enables reusing temporal data across template instantiations. For example, the start time of a task included a project template is specified with respect to the project creation time. When the project template is instantiated to create a new project, the project creation time is used to materialize the task start time. In the particular exemplary configuration discussed, one mechanism to include temporal information in a template is to specify it as variable whose value the user needs to be provide at template instantiation time. For example, the start time of a task can be specified as ${v1} and the actual start time is the value of the variable v1 specified by the user at template instantiation time.

In the exemplary configuration, the template 118 is instantiated (or reinstantiated) as follows: An XML parser is used to parse the template XML into an in-memory DOM tree (if DOM parser is used) or an event sequence (if SAX parser is used). In case of the DOM representation, the DOM tree is traversed in a top-down manner to process each node in the tree. When a node is processed, code is executed to create the corresponding collaborative entity (e.g., a document folder) using the information specified in the node. If an event sequence is used, then the events are processed in the order in which they are generated, and corresponding collaborative entities are created in a manner similar to that in the case of the DOM representation. References to out-of-line content are resolved using the mapping table as explained earlier.

At the time of template instantiation, users 120 may provide information to selectively override information specified in the template 118 and to augment the information specified in the template 118. For example, when a workspace template 118 is instantiated to create a workspace 150, the workspace creator (e.g. user 120) can override workspace 150 properties (such as workspace member default role) specified in the template and provide additional information such as a list of workspace members. If the DOM representation is used, a user can also make one-off modifications to the template (e.g., deleting a document folder) by updating the DOM representation.

If the template is being instantiated to create a new workspace, statistics of user 120 activities is used to recommend potential members for the new workspace. A template 118 can also be applied to an existing entity. For example, a workspace template can be applied to an already existing workspace. The following are some applications of this functionality:

1. Template evolution: a template can evolve over time to accommodate process improvements, user feedback, new requirements, etc. The updated template can be applied to existing entities created from the template to keep them synchronized with the template and thereby, the process or best practice the template embodies.

2. Entities based on multiple templates: support for applying a template to an existing entity enables creation of an entity based on more than one template. This reduces the need to create templates that are union of other templates, e.g., a workspace that will be used both for meetings and document management, can be created based on the meeting workspace and document workspace templates. Further, various conflict resolution schemes are supported for resolving conflicts that may arise while applying a template to an existing entity. For example, the user can choose a system-defined scheme (e.g., entity takes precedence over template) for resolving all conflicts of a specific kind encountered (e.g., file-file conflict) during application of the template. Alternatively, the user may choose to manually resolve each conflict.

Since the exemplary templates employ an XML syntax, creation of a template may occur through a predefined workspace, discussed in the copending patent application cited above, or directly via XML generation. Therefore, a template 118' can be created in either of the following ways:

1. a tool for composing XML can be used to directly create a template document conforming to the CW template schema (Table II).

2. a procedure is provided to create a template for an entity from an instance of the entity (e.g., a workspace). A number of options are supported to selectively include parts of the entity in the template 118', rather than the whole entity. For example, just a folder hierarchy without files or a folder hierarchy with files can be included in a template. This way a template 118' can be created from any existing entity rather than only from an entity specially created for the purpose of creating a template from it.

As indicated above, templates may be employed to codify, or represent, a baseline or procedural entity which may evolve over time. Accordingly, process improvement or evolution of a template that embodies the process, is facilitated as follows: A template evolution workspace 150 is created for the template. This workspace has a child workspace (sub-workspace) that contains an instantiation of the candidate template. The template evolution workspace itself is based on a meta template for process improvement or template evolution. Usage statistics and user feedback on entities based on the candidate template are stored in the template evolution workspace. Members collaborate in the template evolution workspace to improve the candidate template or the process represented by the candidate template. The improvements are applied to the instantiation of the candidate template 118 contained in the child workspace, and a new template is created from the improved instantiation. The new template 118 can be applied to existing entities using the mechanism discussed earlier with regard to template instantiation.

Those skilled in the art should readily appreciate that the programs and methods for defining, capturing and reusing a workspace via a template in a collaboration environment as defined herein are deliverable to a processing device in many forms, including but not limited to a) information permanently stored on tangible non-writeable storage media such as ROM devices, or b) information alterably stored on tangible writeable storage media such as floppy disks, magnetic tapes, CDs, RAM devices, and other magnetic and optical media. The operations and methods may be implemented in a software executable object. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for defining, capturing and reusing a workspace in a collaboration environment has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A computer-implemented method performed by a computer including at least a processor and a memory, the method comprising:
   generating, by the processor into the memory, a workspace template comprising a definition of a plurality of workspace properties, where the workspace template is configured to be parsed by the processor to identify the workspace properties;
   where the workspace properties include at least one template variable for defining at least a portion of a first workspace property, wherein the template variable has a variable value that is dependent upon a second workspace property; and
   in response to a request to generate a workspace at an instantiation time, generating the workspace as a computerized data structure, by at least the processor, from the workspace template wherein the workspace is generated to include the workspace properties from the workspace template, wherein the generating comprises:
   receiving an input to define the second workspace property, and applying the input to the variable value of the template variable; and
   composing the first workspace property with the variable value to define the first workspace property at the instantiation time to complete the workspace properties of the workspace;
   wherein the first workspace property is an email address of an inbox associated with the workspace generated, and wherein the template variable forms a portion of the email address;
   wherein the second workspace property is a name of the workspace generated where the name is received as the input to define the second workspace property; and
   wherein composing the first workspace property includes composing the email address to include the name of the workspace.

2. The computer-implemented method of claim 1, wherein the first workspace property includes a start time of a task defined in the workspace template, wherein the start time of the task is specified as an offset that is a duration relative to the template variable;
   wherein the second workspace property includes a start time of the workspace that is received as the input and is applied to the variable value of the template variable; and
   wherein composing the first workspace property includes composing the start time of the task as the start time of the workspace plus the offset.

3. The computer-implemented method of claim 1, wherein the first workspace property is defined by at least two template variables that are dependent upon at least two other workspace properties.

4. A non-transitory computer-readable storage medium storing computer-executable instructions that, when executed by at least a processor of a computer, cause the computer to:
   generate, into a memory of the computer, a workspace template comprising definitions of a plurality of workspace properties,
   parse, by the processor, the workspace template to identify the workspace properties;
   wherein the workspace properties are identified to include at least one template variable for defining at least a portion of a first workspace property, wherein the template variable has a variable value that is dependent upon a second workspace property; and
   in response to a request to generate a workspace at an instantiation time, generate the workspace, by at least the processor, from the workspace template wherein the workspace is generated to include the workspace properties from the workspace template, wherein the instructions to generate the workspace comprise instructions that when executed by the processor cause the processor to:
   receive an input to define the second workspace property, and apply, by the processor, the input to the variable value of the template variable; and
   compose, by the processor, the first workspace property with the variable value to define the first workspace property at the instantiation time to complete the workspace properties of the workspace;
   wherein the first workspace property is an email address of an inbox associated with the workspace generated, and wherein the template variable forms a portion of the email address;
   wherein the second workspace property is a name of the workspace generated where the name is received as the input to define the second workspace property; and
   wherein the instructions for causing the processor to compose the first workspace property includes instructions for composing the email address to include the name of the workspace.

5. The non-transitory computer-readable storage medium of claim 4,
   wherein the first workspace property includes a start time of a task defined in the workspace template, wherein the start time of the task is specified as an offset that is a duration relative to the template variable;

wherein the second workspace property includes a start time of the workspace that is received as the input and is applied to the variable value of the template variable; and wherein the instructions for causing the processor to compose the first workspace property includes instructions for composing the start time of the task as the start time of the workspace plus the offset.

6. The non-transitory computer-readable storage medium of claim 4, wherein the first workspace property is defined by at least two template variables that are dependent upon at least two other workspace properties.

7. A computing system comprising:

a memory that stores executable instructions;

at least one processor configured to execute the instructions from the memory, wherein executing the instructions by the at least one processor, cause the computing system to:

read, from a storage device, a workspace template comprising definitions of a plurality of workspace properties, parse, by the processor, the workspace template to identify the workspace properties;

wherein the workspace properties are identified to include at least one template variable for defining at least a portion of a first workspace property, wherein the template variable has a variable value that is dependent upon a second workspace property; and in response to a request to generate the workspace at an instantiation time, generate the workspace as a computerized data structure, by at least the processor, from the workspace template wherein the workspace is generated to include the workspace properties from the workspace template, wherein instructions to generate the workspace comprise instructions that when executed by the processor cause the processor to:

receive an input to define the second workspace property, and apply, by the processor, the input to the variable value of the template variable; and compose, by the processor, the first workspace property with the variable value to define the first workspace property at the instantiation time to complete the workspace properties of the workspace;

wherein the first workspace property is an email address of an inbox associated with the workspace generated, and wherein the template variable forms a portion of the email address;

wherein the second workspace property is a name of the workspace generated where the name is received as the input to define the second workspace property; and wherein the instructions for causing the processor to compose the first workspace property includes instructions for composing the email address to include the name of the workspace.

8. The computing system of claim 7, wherein the first workspace property includes a start time of a task defined in the workspace template, wherein the start time of the task is specified as an offset that is a duration relative to the template variable;

wherein the second workspace property includes a start time of the workspace that is received as the input and is applied to the variable value of the template variable; and wherein the instructions for causing the processor to compose the first workspace property includes instructions for composing the start time of the task as the start time of the workspace plus the offset.

9. The computing system of claim 7, wherein the first workspace property is defined by at least two template variables that are dependent upon at least two other workspace properties.

\* \* \* \* \*